Oct. 19, 1937.  W. ELLIOTT  2,096,230
SAFETY TRIP SHOVEL BACK
Filed March 5, 1935  2 Sheets-Sheet 1
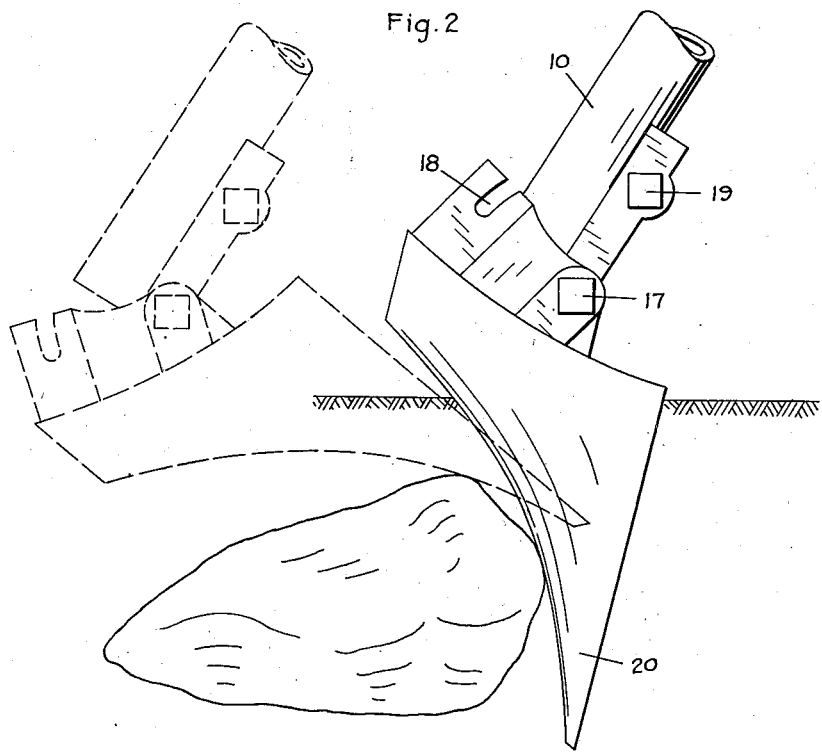
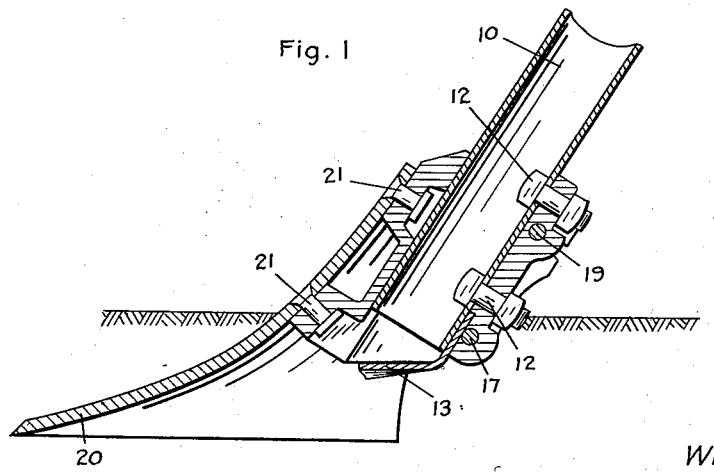
INVENTOR.
William Elliott
BY
ATTORNEY Oct. 19, 1937.  W. ELLIOTT  2,096,230
SAFETY TRIP SHOVEL BACK
Filed March 5, 1935  2 Sheets-Sheet 2
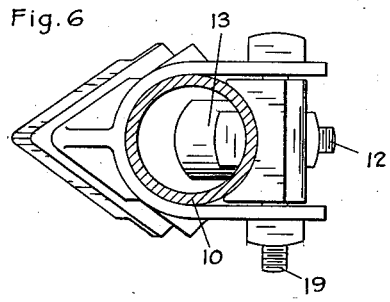
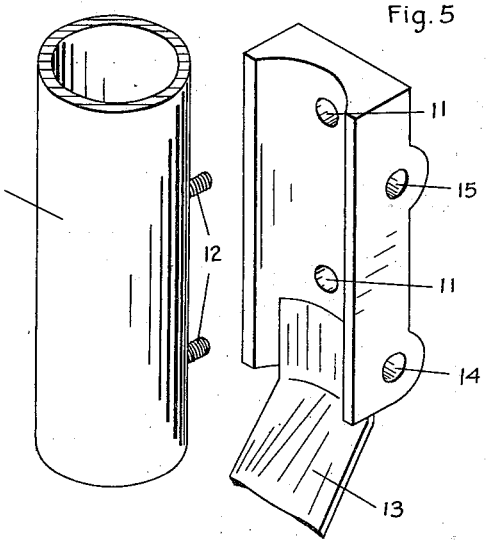
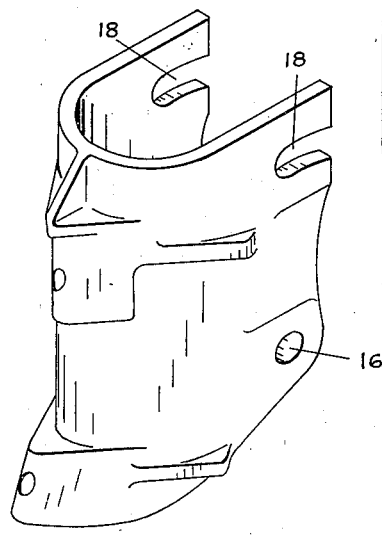
INVENTOR.
William Elliott
BY *Emil F. Lange*
ATTORNEY Patented Oct. 19, 1937

2,096,230

UNITED STATES PATENT OFFICE 2,096,230

SAFETY TRIP SHOVEL BACK

William Elliott, Beatrice, Nebr., assignor to Dempster Mill Manufacturing Company, Beatrice, Nebr., a corporation of Nebraska Application March 5, 1935, Serial No. 9,443

7 Claims. (Cl. 111—86)

My invention relates to safety trip shovel backs, its primary object being the provision of a device which combines a seed tube with a shovel in a manner such that the shovel will pass over an obstruction in the soil without interference with the seed tube.

Another object of the invention is the provision of a combined shovel and seed tube, the seed tube being associated with the seed distributor and the connection between the shovel and the seed tube being yieldable on encountering an obstruction.

Another object of the invention is the combination of a seed tube and a shovel having a transverse pivotal connection which is positioned below the soil surface when the shovel is operating at its normal depth.

Another object of the invention is the provision of a shovel back and a trip block which are pivotally connected at the lower rear portion of the shovel back, the shovel back being adapted to be secured to a shovel and the trip block being adapted for attachment to a seed tube.

Having in view these objects and others which will be pointed out in the following description, I will now refer to the drawings, in which Figure 1 is a view in median vertical section showing the shovel and the seed tube and the mechanism of the safety trip.

Figure 2 is a view in side elevation showing the action of the various parts after the shovel encounters an obstruction.

Figure 3 is a view in perspective of the shovel back member.

Figure 4 is a view in perspective of the lower end portion of the seed tube.

Figure 5 is a perspective view of the trip block.

Figures 3, 4 and 5 may be considered as a single figure showing the three parts in perspective and in their disassembled relation.

Figure 6 is a plan view of the parts shown in Figures 3, 4 and 5 in their assembled relation.

The safety trip shovel back is designed particularly for use in connection with the Furrow seeding machine which is shown and described in Patent No. 1,897,421, granted February 14, 1933 to Dempster Mill Manufacturing Company on an application filed by Charles B. Dempster and myself. The furrow seeding machine of that patent includes a plurality of furrow opening and seeding members in which each shovel is associated with a seed tube which broadcasts the seed in the bottom of the furrow.

In the present instance the seed tube is designated in the various figures by the numeral 10. As is well known in the art, such seed tubes have connections with the seed box to deliver the seed to the bottom of the furrow. Such seed tubes are usually slidable within a limited range in an up and down direction to avoid injury to the mechanism when the shovel encounters unusual resistances, as for example a spring tension device (not shown) which holds the entire structure in its usual operating position but which when encountering unusually high obstructions will force the structure up compressing the spring and thus allowing the shovel to pass up and over such obstruction. My safety trip shovel back is secured firmly to the lower end portion of the seed tube 10 by means of the trip block shown in Figure 5 and consists of the parts shown in Figures 3 and 5.

The trip block shown in Figure 5 is provided with a pair of apertures 11 in registration with similar apertures in the seed tube 10. Bolts 12 are passed through these apertures to connect the trip block to the seed tube 10. The trip block is thus very firmly secured against displacement and it becomes in effect an integral part of the seed tube. The seed tube is further provided with a seed distributor 13 which slopes downwardly at all its edges so as to deliver the seed over both of its lateral edges as well as its forward edge. The trip block is further provided with a pair of transverse apertures 14 and 15.

By reference to Figure 1 it will be noted that the bolts 12 have relatively large heads. The purpose of these heads is to prevent the movement of a steady stream of seed and to scatter the seed in the tube so that it will more readily be deposited in the bottom of the furrow in a widely scattered condition. The tube 10 is of relatively large diameter so that the large heads of the bolts 12 will not interfere with the passage of the seed through the tubes but so that the heads 12 will serve to a certain extent as agitators for the seed.

The shovel back as shown in Figure 3 has an inner surface which is adapted to contact loosely with the opposite lateral sides and the forward surface of the seed tube 10. Its width is such that it straddles the trip block shown in Figure 5. It is provided with apertures 16 in both of its wings and these apertures are so positioned as to be brought into registration with the aperture 14 of the trip block to receive a bolt 17 for securing the shovel back to the trip block. The shovel back will have pivotal movement about the bolt 17 as an axis. The wings of the shovel back are each provided with an arcuate slot 18 for straddling a bolt 19 passing through the aperture 15 of the trip block. When the bolt 19 extending through the arcuate slots 18 is drawn up the friction of the head and nut on the sides of the shovel back and on the inner surfaces of the shovel back with the flat surfaces of the trip block hold the shovel 20 and the shovel back in normal operating position as shown in Figure 1.

The shovel 20 is secured to the shovel back by means of bolts 21 passing through aligning apertures of the shovel and the shovel back. These bolts are of the countersunk type and their heads are countersunk in the shovel. The shovel back is recessed on its under side for the reception of the nuts on the bolts 21. This provides a continuous and smooth soil working surface for the shovel 20.

On encountering a relatively fixed obstruction, the forward parts of the device being unable to remove the obstruction overcomes the friction of the contact surface of the device as caused by bolt 19, the shovel 20 and shovel back will rotate about the axis 17 as a pivot. The position of this axis is extremely important. While the shovel 20 may operate at any suitable depth within the limit of range of depths, the parts are so designed that the axis 17 is normally below the soil surface. In the implement on which we use the described trip mechanism, the radius of movement of the tip of the shovel 20 about its axis 17 is only eleven inches. The seed tube 10 in most of the implements of this type have an automatic movement in the direction of their lengths so that a part of the upward movement of the pivot 17 is taken up by the yieldable movement of the seed tube 10. This pivot 17 will necessarily rise somewhat as shown in Figure 2 when the shovel 20 assumes its extreme position as shown in full line in Figure 2. If the position of the axis 17 were such that the tip of the shovel 20 had a greater radius of movement, the upward movement of the axis 17 would be communicated to an appreciable extent to the implement as a whole which would thus be materially elevated to seriously disturb the function of the other shovels and seed dropping mechanism of the implement. The parts are so designed that no breakage can occur since the range of pivotal movement about the axis 17 is great enough for the shovel 20 to assume the dotted line position of Figure 2. The seed distributor 13 is so designed and positioned that it will clear all moving parts of the trip mechanism. The low position of the axis 17 combined with its short radius of movement imparts only a slight jar to the implement to warn the operator of the fact that one of the shovels has encountered an obstruction. The operator immediately stops the operation of the implement and elevates the described device above the ground line by means provided on the machine disclosed in Patent No. 1,897,421 and restores the shovel 20 to operative position.

Having thus described my invention in such full, clear, and exact terms that its construction and operation will be readily understood by others skilled in the art to which it pertains, what I claim as new and desire to secure by Letters Patent of the United States is:

1. A seeding tool including a furrow opening shovel and a seed tube immediately in the rear thereof, a shovel back secured to said shovel and embracing said seed tube, and a trip block secured to said seed tube and pivotally secured to said shovel back in the rear of said seed tube.

2. A seeding tool including a furrow opening shovel, a forwardly and downwardly inclined seed tube immediately in the rear of said shovel, a shovel back secured to said shovel and embracing said seed tube, a trip block rigidly secured to said seed tube and having a transverse pivotal connection with said shovel back at the rear of said seed tube whereby said shovel may swing backwardly on encountering an obstruction, and a seed distributor secured to said trip block at the lower extremity thereof and projecting forwardly and downwardly therefrom the parts being so proportioned that said seed distributor will lie above the arcuate path of said shovel.

3. A shovel back for the furrow opening shovels of a furrow seeding machine, said shovel back being adapted for attachment to the shovel and having rearwardly extending wings for embracing the lower end portion of a seed tube of the furrow seeding machine, a trip block adapted to be secured to the lower end portion of the seed tube, and a transverse pivotal connection between said shovel back and said trip block, said pivotal connection being below the plane of the soil surface during the normal operation of the shovel.

4. A shovel back for the furrow opening shovels of a furrow seeding machine, said shovel back being adapted to be secured to the shovel and having a pair of rearwardly projecting wings, a trip block adapted to be secured to the lower end portion of a seed tube of the furrow seeding machine, upper and lower transverse pins in said trip block, apertures in said wings of said shovel back for receiving the lower of said pins to function as a pivot between said shovel back and said trip block, and a pair of arcuate slots in said wings for releasably engaging the upper of said pins.

5. A shovel back for a furrow opening shovel of a furrow seeding machine, said shovel back being adapted to be secured to the shovel against the rear thereof and being U-shaped in horizontal section for loosely receiving the lower end portion of a seed tube of a furrow seeding machine, a trip block adapted to be secured to the seed tube at the rear side thereof and in the rear of said shovel back, a forwardly and downwardly inclined seed distributor on said trip block, and a pivotal connection between said shovel back and said trip block.

6. A shovel back for a furrow opening shovel of a furrow seeding machine, said shovel back being adapted to be secured to the shovel and having a pair of rearwardly projecting wings for loosely receiving a seed tube therebetween, a trip block adapted to be secured to the rear wall of the lower end portion of the seed tube, said wings and said trip block being provided with aligned apertures, a pivot pin passing through the apertures of said wings and said trip block whereby said shovel back may have pivotal movement relative to said trip block, said trip block being also provided with an upper transverse aperture above said pivot pin, a pair of arcuate slots in said wings, and a bolt passing through the upper aperture of said trip block and through said slots to function as a guide for the pivotal movements of said shovel back, the arrangement being such that said bolt may be tightened to frictionally resist movement of said shovel back on said trip block.

7. In a furrow seeding machine of the type having tools for opening a plurality of substantially parallel furrows of predetermined depth, a seeding tool including a furrow opening shovel and a seed tube immediately in the rear thereof, a shovel back secured to said shovel and embracing said seed tube, and a trip block secured to said seed tube and pivotally secured to said shovel back in the rear of said seed tube at a point below the normal plane of the soil surface while the furrow seeding machine is in operation.

WILLIAM ELLIOTT.